Dec. 27, 1955   H. R. WHILDIN   2,728,824
BICYCLE STOP LIGHT
Filed July 23, 1951
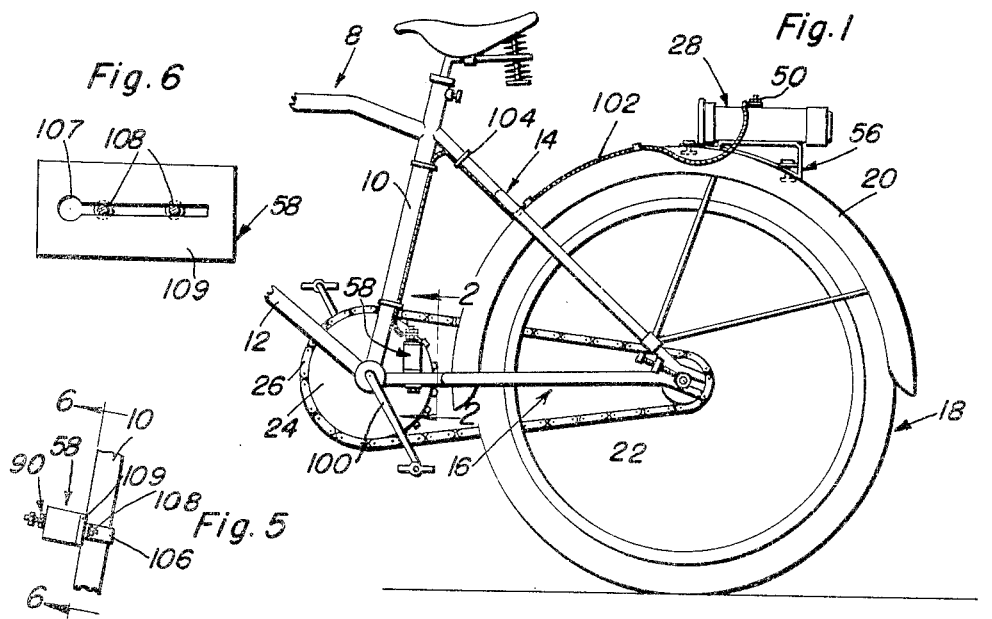
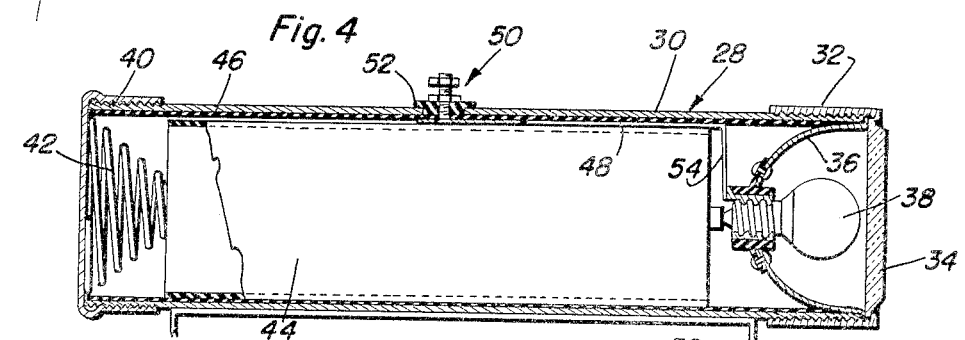
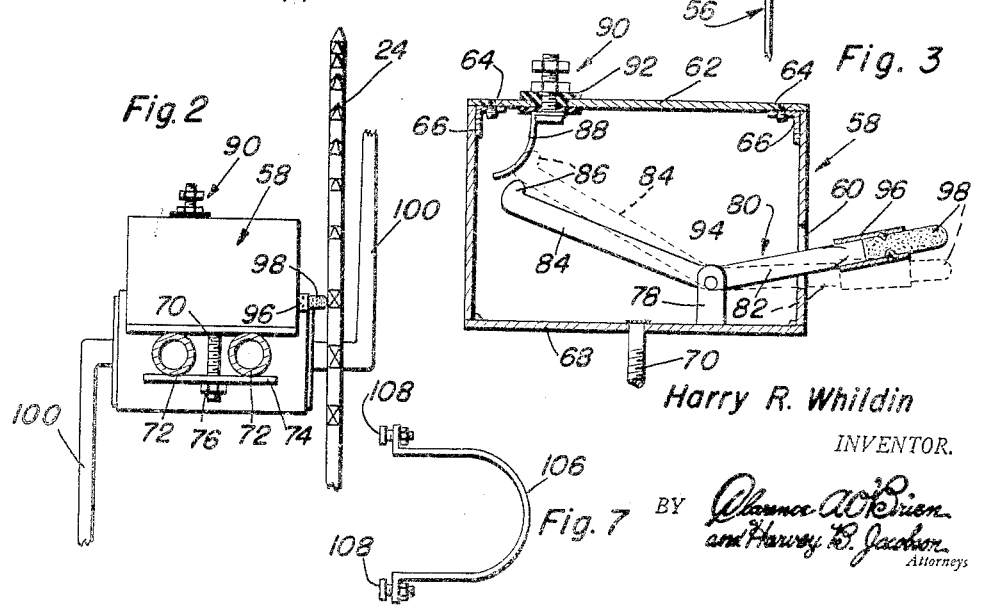
Harry R. Whildin
INVENTOR.

United States Patent Office 2,728,824
Patented Dec. 27, 1955

2,728,824
BICYCLE STOP LIGHT
Harry R. Whildin, Summit Hill, Pa.

Application July 23, 1951, Serial No. 238,101

2 Claims. (Cl. 200—61.12)

The present invention relates to novel accessory means which when properly installed on stock parts of a conventional-type two-wheeled bicycle will serve to provide the latter with a practical and safe-guarding stop light.

Briefly stated the invention has to do with a simple flash-type stop light which is mounted at a point of vantage on the rear wheel fender and equally novel switch means which is conveniently mounted in an out-of-the-way position on the bicycle frame structure, said switch means being mechanically tripped to turn the stop light on and off, depending on the forward and rearward travel motions of the usual sprocket wheel.

One object of the invention, generally speaking, is to improve upon and reduce the number of elements entering into the over-all combination, thereby not only increasing the efficiency of the structure as a whole, but also rendering the same less costly to manufacture and to in other ways simplify factors of assembling, sale and ready installation for practical use.

More specifically, the invention has to do with a simple flash light carried by a bracket which is mounted on the aforementioned fender, said flash light having a dry cell, the casing of the flash light being provided with a wire terminal and a conductor strip being mounted in the flashlight casing to afford cooperative connection between the terminal and usual flash bulb.

More importantly, the invention appertains to an efficient and aptly constructed switch with unique trip means whereby the switch may be opened and closed depending on the forward and rearward motions of the sprocket wheel with which said trip means is cooperable.

Other objects and advantages will become more readily apparent from the following description and the accompanying sheet of illustrative drawings.

In the accompanying drawings wherein like numerals are employed to designate like parts throughout the views:

Figure 1 is a side elevational view of the rear end portion of a conventional bicycle equipped with the improved stop light and switch by which said light is automatically turned off and on.

Figure 2 is an enlarged section taken on the plane of the line 2—2 of Figure 1, looking in the direction of the arrows.

Figure 3 is an enlarged view in section and elevation showing the details of construction of the switch or as it is sometimes otherwise called, circuit make and break means.

Figure 4 is a view in section and elevation showing the lighting means, specifically, a suitably modified flashlight.

Figure 5 is a fragmentary elevational view showing the same switch but a different form of bracket for attaching it to the bicycle frame at a different place.

Figure 6 is an enlarged view taken on the vertical line 6—6 of Figure 5, looking in the direction of the arrows.

Figure 7 is an enlarged view of the clamp shown in Figure 5.

Referring now to the drawings reference is had first to Figures 1 to 4 inclusive. Referring for convenience to Figure 1, the bicycle frame means is denoted generally by the numeral 8 and it is conventional and includes a rear vertical post 10, diagonal brace 12 and rearwardly disposed forks 14 and 16 for the rear wheel 18. The rear wheel fender is denoted at 20, the rear sprocket wheel and brake means at 22, the main forward sprocket wheel at 24 and the endless sprocket chain at 26. All of these details are of course conventional.

The stop light means, as a unitary assemblage, is denoted by the numeral 28 and is a suitably sized and slightly revised flashlight. It is characterized by a suitable casing 30, screw threaded ring 32 holding the lens 34 in place and also assembling and mounting the reflector 36, socket means and bulb 38. There is a screw cap 40 on the rear and internal coil spring means 42 bearing against the coacting end of the jacketed dry cell 44 whose forward contact is engaged with the contact means on the bulb 38 in the manner shown in Figure 4. There is an insulation sleeve 46 provided in the casing and this serves to properly mount the L-shaped conductor strip 48. This strip is interposed between the insulated jacket on the dry cell and the insulation sleeve 46 and is connected at one end with a binding post 50 which as shown is suitably mounted in a grommet 52 of suitable insulation material. The short or lateral end portion 54 of the strip is electrically joined with the contact means on the bulb 38, as shown. The entire light unit is mounted on a suitable bracket 56 which in turn is appropriately fastened, in a suitable way on the fender 20 as shown.

The circuit make and break means or novel switch unit is such that it may be mounted either on the upright 10 or the horizontal fork means 16. In its preferred form it is mounted as shown on the fork means 16 as illustrated in Figure 1. The switch means comprises an appropriate casing or housing 58 which takes the form of a rectangular box one end of which is provided with an arm clearance slot 60. If desired the box may have a cover or lid 62 which is removable and which is held in place by screws or the like 64—64 connected to angle brackets 66 located in the interior of the box or casing. The bottom wall 68 is provided with a screw threaded assembling, grounding and retaining stud 70. Normally this passes through the tubular members 72 (see Fig. 2) where it is secured by clamping plate 74 held in place by a nut 76 and grounder. Appropriate bracket means 78 is mounted on the interior of the casing and serves to accommodate the approximately V-shaped lever means 80. The vertex or central portion is pivoted on the bracket means 78 and comprises a trip arm 82 and a coplanar movable contact or circuit make and break arm 84. The arms are preferably at the obtuse angular relationship shown and the arm 84 terminates in a cam 86 which is engageable with an encased spring 88 carried by the binding post 90 which latter is mounted in an insulated grommet 92 carried by the lid or cover 62. The weight of the arm 84 is such that the heavier arm 82 has a tendency to over balance arm 84 and to swing downward to the dotted line position shown in Figure 3. The arm 82 is therefore trippable to assume a released position by the properly balanced weight and gravity factors. The numeral 96 is a sleeve or ferrule carried by the outer end of the arm 82 which in turn carries a rubber or equivalent friction shoe 98, said shoe being coaxial with the arm 82 and adapted to have wiping or rubbing contact with the surface of the sprocket wheels 24 in the manner shown in Figure 2.

It will be understood that when the device is properly installed on the frame work and in relation to the sprocket wheel as shown in Figures 1 and 2 the arm 82 approaches the surface of the sprocket wheel at an approximate oblique angle and extends in a slightly upward direction. The rubber or equivalent shoe 98 has light wiping contact with the sprocket wheel and so long as the wheel is driven or turns forwardly the lever means 80 is substantially undisturbed. It perhaps vibrates or bobs slightly but the action is such that the arm 84 is "down" and therefore the contacts 86 and 88 are separated and the circuit is open. The circuit also remains open when coasting. On the other hand, just as soon as the rider steps on and moves either of the pedal cranks 100 to braking position the arms 84 and 82 take the dotted line positions shown which means that the sprocket wheel exerts sufficient pressure on the friction shoe 98 to drag the same down and in so doing the contacts 86 and 88 come together and close the circuit. To accomplish this it is necessary to provide a circuit wire 102 and this is joined at one end to the binding post 90 and at the opposite end to the first-named binding post 50. Any appropriate fastening clips 104 may be provided for purposes of mounting the wire on the wheel fender and frame members.

In certain instances it may not be desirable to mount the switch box in the position shown in Figures 1 and 2. It may be more desirable to mount it on the vertical post 10 within the vicinity of the sprocket wheel. This can best be accomplished by furnishing the purchaser with a substantially U-shaped strap 106 having bolts 108—108 which are separably joined to the switch box 58, this by providing a key hole slot 107 in the bottom 109 of the box. Obviously, however, the ways and means whereby the switch box is mounted are incidental to the main stop light and switch devices.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention what is claimed as new is:

1. For use in conjunction with a bicycle embodying a sprocket drive incorporating a sprocket wheel and having frame means which is wheel supported and adjacent to said sprocket wheel; a switch box which is adapted to be removably and adjustably clamped on the frame means in close operative relationship in respect to a cooperating surface of the stated sprocket wheel, comprising a box having top, bottom, side and end walls, one of said walls being adapted to be situated in close spaced parallelism in respect to the cooperating side of said sprocket wheel and having a vertical slot therein, a binding post including a terminal mounted on the top of the box and provided with an arcuate resilient contact member depending into and confined within the space of said box, bracket means mounted on the bottom wall of the box adjacent to said slot, a substantially V-shaped lever embodying a pair of coplanar arms joined by a vertex portion, said vertex portion being pivotally mounted on said bracket means, one arm being wholly confined in the space of the box and extending upwardly and at an angle to the bottom and terminating at its free end in a cam having cooperating wiping contact with said contact member, the other arm extending upwardly and outwardly through the slot and being provided on its outward end with a ferrule having a rubber friction shoe cooperable with the sprocket, the over-all weight of the last named arm, ferrule and shoe being greater than the weight of the first named arm.

2. For use in conjunction with a bicycle embodying a sprocket drive incorporating a sprocket wheel and having frame means which is wheel supported and adjacent to said sprocket wheel; a switch box which is adapted to be removably and adjustably clamped on the frame means in close operative relationship in respect to a cooperating surface of the stated sprocket wheel, comprising a box having top, bottom, side and end walls, one of said walls being adapted to be situated in close spaced parallelism in respect to the cooperating side of said sprocket wheel and having a vertical slot therein, a binding post including a terminal mounted on the top of the box and provided with an arcuate resilient contact member depending into and confined within the space of said box, bracket means mounted on the bottom wall of the box adjacent to said slot, a substantially V-shaped lever embodying a pair of coplanar arms joined by a vertex portion, said vertex portion being pivotally mounted on said bracket means, one arm being wholly confined in the space of the box and extending upwardly and at an angle to the bottom and terminating at its free end in a cam having cooperating wiping contact with said contact member, the other arm extending upwardly and outwardly through the slot and being provided on its outer end with a friction shoe, the over-all weight of the last-named arm, including said shoe, being greater than the weight of said first-named arm.

References Cited in the file of this patent

UNITED STATES PATENTS

| | | |
|---|---|---|
| 2,090,805 | Oliver | Aug. 24, 1937 |
| 2,172,925 | Meyerhrhoefer | Sept. 12, 1939 |
| 2,222,075 | Johnston | Nov. 19, 1940 |
| 2,271,664 | Sarchino | Feb. 3, 1942 |
| 2,281,314 | Kurilla | Apr. 28, 1942 |
| 2,497,012 | Pearl | Feb. 7, 1950 |
| 2,507,420 | Phillips et al. | May 9, 1950 |

FOREIGN PATENTS

| | | |
|---|---|---|
| 203,005 | Switzerland | May 16, 1939 |